US012552251B2

(12) United States Patent
Miyazawa

(10) Patent No.: US 12,552,251 B2
(45) Date of Patent: *Feb. 17, 2026

(54) VEHICLE DISPLAY DEVICE

(71) Applicant: YAZAKI CORPORATION, Tokyo (JP)

(72) Inventor: Tomohiro Miyazawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,133

(22) Filed: Aug. 19, 2024

(65) Prior Publication Data

US 2025/0074193 A1    Mar. 6, 2025

(30) Foreign Application Priority Data

Aug. 30, 2023  (JP) ................. 2023-140087

(51) Int. Cl.
*B60K 35/233*    (2024.01)
*B60K 35/235*    (2024.01)

(52) U.S. Cl.
CPC .......... *B60K 35/233* (2024.01); *B60K 35/235* (2024.01); *B60K 2360/21* (2024.01); *B60K 2360/23* (2024.01); *B60K 2360/31* (2024.01)

(58) Field of Classification Search
CPC ...................................................... G06F 3/013
See application file for complete search history.

(56) References Cited

U.S. PATENT DOCUMENTS

| 2009/0237803 | A1* | 9/2009 | Hotta | G02B 3/005 |
| | | | | 359/630 |
| 2016/0306600 | A1* | 10/2016 | Shibata | G02B 27/0179 |
| 2021/0302727 | A1* | 9/2021 | Sugiyama | B60K 35/28 |

FOREIGN PATENT DOCUMENTS

JP    2016-130771 A    7/2016

* cited by examiner

*Primary Examiner* — Nan-Ying Yang
(74) *Attorney, Agent, or Firm* — KENEALY VAIDYA LLP

(57) ABSTRACT

A vehicle display device including an image display unit and a control unit is provided. An image includes a both-eye region that is a region visually recognized by both eyes of the driver and a one-eye region that is a region visually recognized by only one eye of the driver. When displaying a design in the one-eye region, the control unit temporarily displays the design in a cut-in display area provided in the both-eye region and then moves a display position of the design to the one-eye region.

3 Claims, 5 Drawing Sheets

VEHICLE DISPLAY DEVICE

CROSS-REFERENCE TO RELATED APPLICATIONS

This application is based on and claims priority under 35 USC 119 from Japanese Patent Application No. 2023-140087 filed on Aug. 30, 2023, the contents of which are incorporated herein by reference.

TECHNICAL FIELD

The present disclosure relates to a vehicle display device.

BACKGROUND ART

In the related art, there is known a vehicle display device such as a head-up display for visually recognizing an image as a virtual image from positions of eyes (eyepoint) of a driver. For example, Patent Literature 1 describes a display device having improved visibility of an image by making luminance of a one-eye region that is visually recognizable only by one eye higher than luminance of a both-eye region that is visually recognizable by both eyes.

CITATION LIST

Patent Literature

Patent Literature 1: JP2016-130771A

SUMMARY OF INVENTION

However, even with higher luminance, display of a design in the one-eye region may be difficult to notice compared with a case of displaying the design in the both-eye region.

The present disclosure is made in view of the above circumstance, and an object of the present disclosure is to provide a vehicle display device by which a driver can easily notice display of a design even when the design is displayed in a one-eye region.

To achieve the above object, the vehicle display device according to the present disclosure has following features.

The vehicle display device includes an image display unit that emits display light for an image; an optical system that projects the display light emitted from the image display unit toward a reflecting surface in front of a driver; and a control unit that controls the image display unit. The image includes a both-eye region that is a region visually recognized by both eyes of the driver and a one-eye region that is a region visually recognized by only one eye of the driver. When displaying a design in the one-eye region, the control unit temporarily displays the design in a cut-in display area provided in the both-eye region and then moves a display position of the design to the one-eye region.

According to the present disclosure, there is provided a vehicle display device by which a driver can easily notice display of a design even when the design is displayed in a one-eye region.

The present disclosure is briefly described above. Details of the present disclosure can be clarified by reading modes (hereinafter, referred to as "embodiments") for carrying out the invention to be described below with reference to the accompanying drawings.

DESCRIPTION OF EMBODIMENTS

Specific embodiments of the present disclosure will be described below with reference to the drawings.

Figure 1:
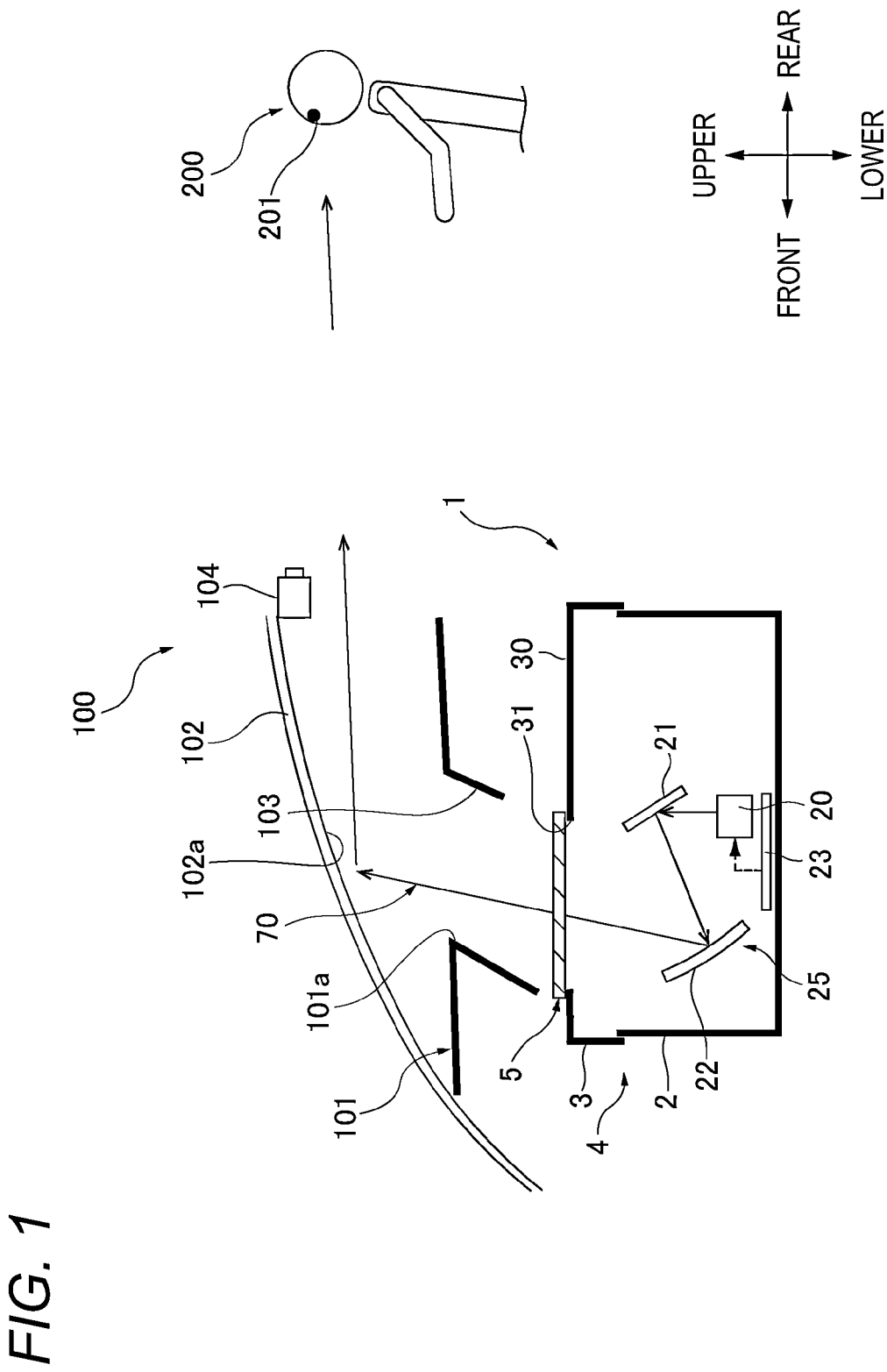
FIG. 1 is a schematic configuration diagram showing a vehicle display device according to an embodiment.
Figure 2:
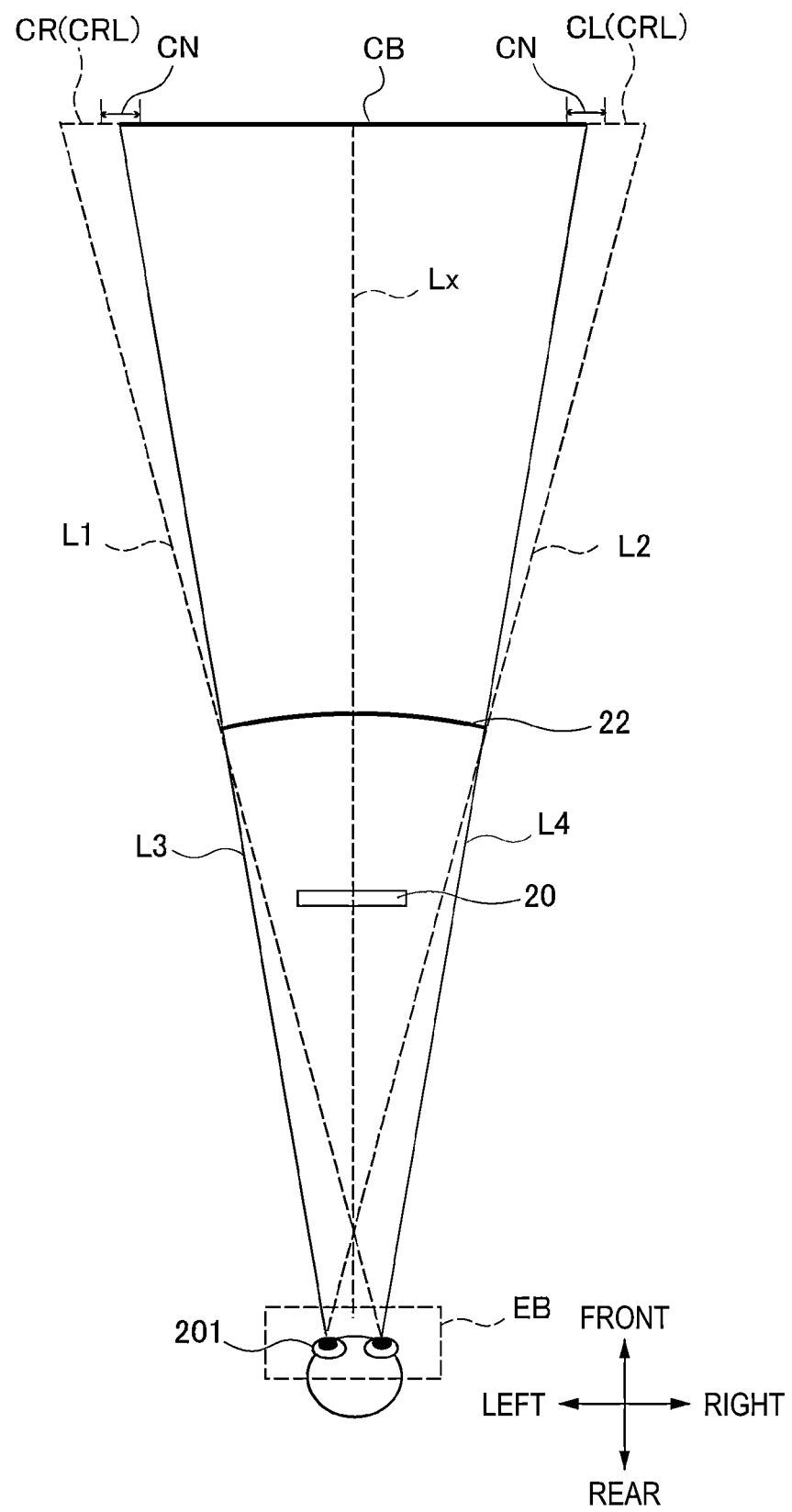
FIG. 2 shows an optical positional relationship among a virtual image, a second mirror, and eyes of a driver when the eyes of the driver are located in a center of an eye box in a left-right direction.

Hereinafter, for convenience of description, "front", "rear", "left", "right", "upper", and "lower" are defined as shown in FIGS. 1 and 2. A "front-rear direction", a "left-right direction", and an "upper-lower direction" are orthogonal to one another.

First Embodiment

First, a first embodiment will be described. As shown in FIG. 1, a vehicle display device 1 of the present embodiment is mounted on a vehicle 100 and constitutes a head-up display. The vehicle display device 1 is disposed, for example, inside an instrument panel 101. The instrument panel 101 has an opening 101a that opens upward. The opening 101a faces a windshield 102 in the upper-lower direction of the vehicle 100.

The vehicle display device 1 includes a case 4, a cover 5, an image display unit 20, a control unit 23, and an optical system 25. The image display unit 20, the control unit 23, and the optical system 25 are accommodated inside the case 4. The case 4 includes a body 2 and a lid member 3 that engages with the body 2. The body 2 has an opening that opens upward. The lid member 3 closes the opening of the body 2 from above. The lid member 3 includes a wall portion 30 that faces the opening 101a. The wall portion 30 has an opening 31 that opens upward. The case 4 is disposed such that the opening 31 faces the opening 101a. The cover 5 is a plate-shaped member that closes the opening 31 of the lid member 3. The cover 5 is formed of a light-transmissive resin such as polycarbonate (PC) and acrylic.

The image display unit 20 is a device that emits display light 70 for an image. The shown image display unit 20 is a liquid crystal display device, and is, for example, a thin film transistor liquid crystal display (TFT-LCD). However, the image display unit 20 is not limited to the liquid crystal display device. The image display unit 20 may be, for example, a device that generates an image on a transmissive screen by scanning the screen with laser light.

The optical system 25 includes a first mirror 21 and a second mirror 22. The first mirror 21 reflects the display light 70 emitted from the image display unit 20 toward the second mirror 22. The first mirror 21 is, for example, a plane mirror. The second mirror 22 reflects the display light 70 toward the windshield 102. A shape of a reflecting surface of the second mirror 22 is, for example, a free-form surface. The second mirror 22 is, for example, a concave mirror that enlarges the display light 70.

The display light 70 reflected by the second mirror 22 passes through the opening 31 and the opening 101a, and is reflected toward a driver 200 by a reflecting surface 102a of the windshield 102. A virtual image is formed by the display light 70 incident on eyes 201 of the driver 200. The instrument panel 101 is provided with a tubular wall portion 103. The wall portion 103 surrounds an optical path of the display light 70 from the opening 31 toward the opening 101a.

As shown in FIG. 2, an image displayed on the image display unit 20 to the driver 200 as a virtual image includes a both-eye region CB that is a region visually recognized by both eyes of the driver 200, a right-eye region CR that is a region not visually recognized by the left eye and only visually recognized by the right eye, and a left-eye region CL that is a region not visually recognized by the right eye and only visually recognized by the left eye. The right-eye region CR and the left-eye region CL are regions on end portion sides in the left-right direction relative to the both-eye region CB. Hereinafter, the right-eye region CR and the left-eye region CL are also collectively referred to as "one-eye region CRL".

Figure 3:
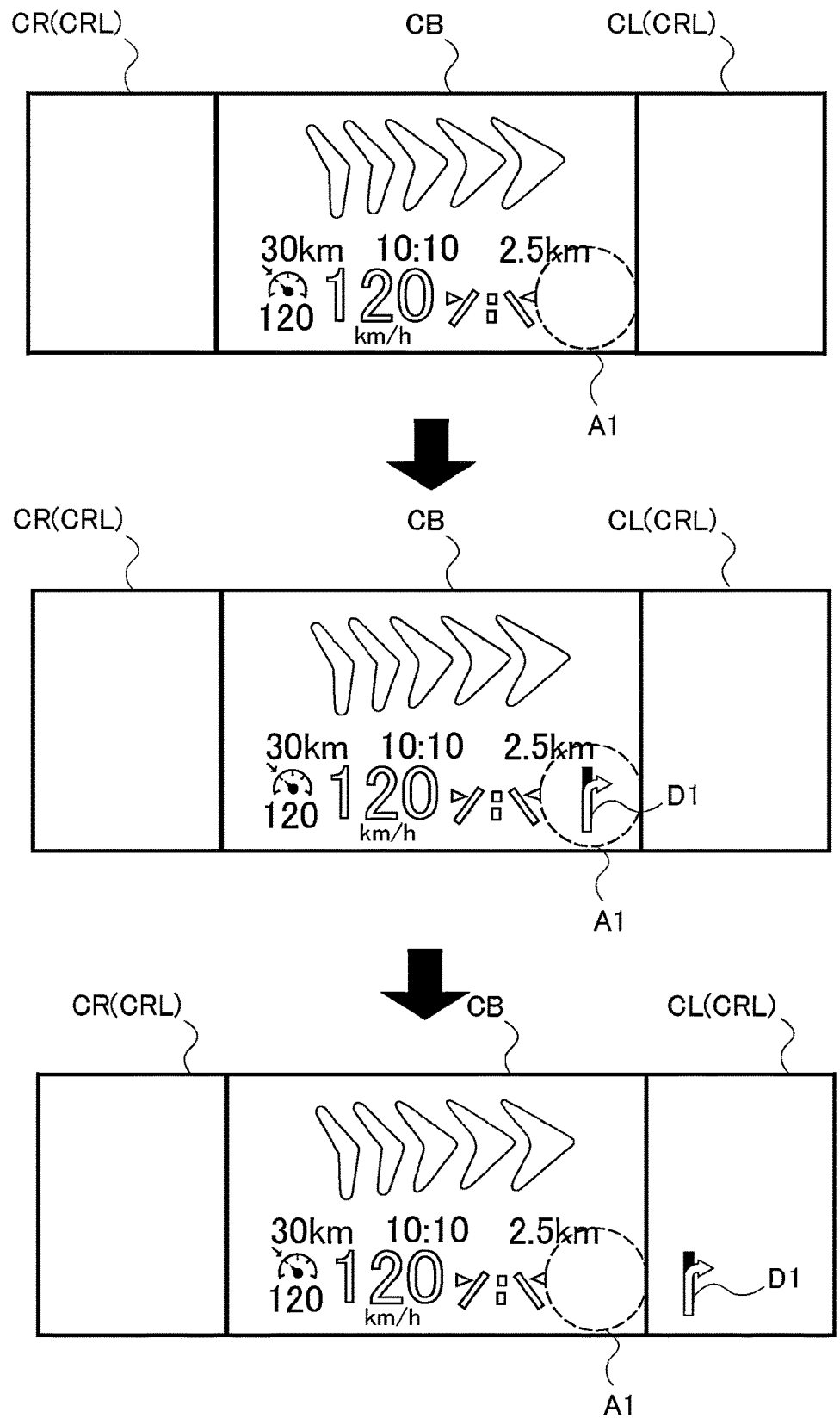
FIG. 3 shows arrangements of regions of a virtual image visually recognized by the driver.

FIG. 3 shows arrangements of regions of a virtual image visually recognized by the driver 200. As shown in FIG. 3, a left end region of the virtual image corresponds to the right-eye region CR, a central region of the virtual image corresponds to the both-eye region CB, and a right side region of the virtual image corresponds to the left-eye region CL.

The control unit 23 includes a control circuit that controls the image display unit 20. The control unit 23 is mounted on, for example, a control substrate disposed inside the case 4. The control unit 23 controls the image display unit 20 according to, for example, a program stored in advance to generate an image.

The vehicle 100 includes a driver monitor 104. The driver monitor 104 includes a camera disposed in front of the driver 200. The driver monitor 104 images the driver 200 and generates a driver image. The driver monitor 104 detects a position of a head of the driver 200 and positions of the eyes 201 (viewpoint positions) of the driver 200 based on the driver image. A detection result by the driver monitor 104 is sent to the control unit 23.

The control unit 23 sets the both-eye region CB and the one-eye region CRL (see FIG. 2) on a display screen of the image display unit 20, and changes luminance between the both-eye region CB and the one-eye region CRL. As shown in FIG. 3, when displaying a right-turn guidance design D1(=design) in the one-eye region CRL, for example, the control unit 23 temporarily displays the right-turn guidance design D1 in a cut-in area A1 provided in the both-eye region CB, and then moves a display position of the right-turn guidance design D1 to the one-eye region CRL.

Thereafter, details of the both-eye region CB and the one-eye region CRL will be described with reference to FIG. 2. FIG. 2 shows an optical positional relationship among a virtual image, a second mirror, and the eyes 201 of the driver 200. The positions of the eyes 201 shown in FIG. 2 are central positions of an eye box EB in the left-right direction. The eye box EB is a range assumed in advance as a range in which the positions of the eyes 201 move. The eye box EB has a prescribed width in the left-right direction. The vehicle display device 1 is configured such that an image can be visually recognized from the driver 200 when the eyes 201 are inside the eye box EB.

When light reflected by an entire surface of the second mirror 22 is visually recognized, as shown in FIG. 2, a left end position of the right-eye region CR is on an extension of a light beam "L1" connecting the right eye of the driver 200 and a left end position of the second mirror 22. A right end position of the left-eye region CL is on an extension of a light beam "L2" connecting the left eye of the driver 200 and a right end position of the second mirror 22. The driver 200 cannot visually recognize the left end position of the right-eye region CR with the left eye, and cannot visually recognize the right end position of the left-eye region CL with the right eye.

A left end position of the both-eye region CB is on an extension line of a configuration "L3" connecting the left eye of the driver 200 and a left position of the second mirror 22. A right end position of the both-eye region CB is on an extension line of a configuration "L4" connecting the right eye of the driver 200 and a right position of the second mirror 22.

As is clear from FIG. 2, when the viewpoint positions of the driver 200 are in the central positions of the eye box EB in the left-right direction, the both-eye region CB, the right-eye region CR, and the left-eye region CL can be set based on an interval between both eyes of the driver 200 and an arrangement position of the optical system 25.

Figure 4:
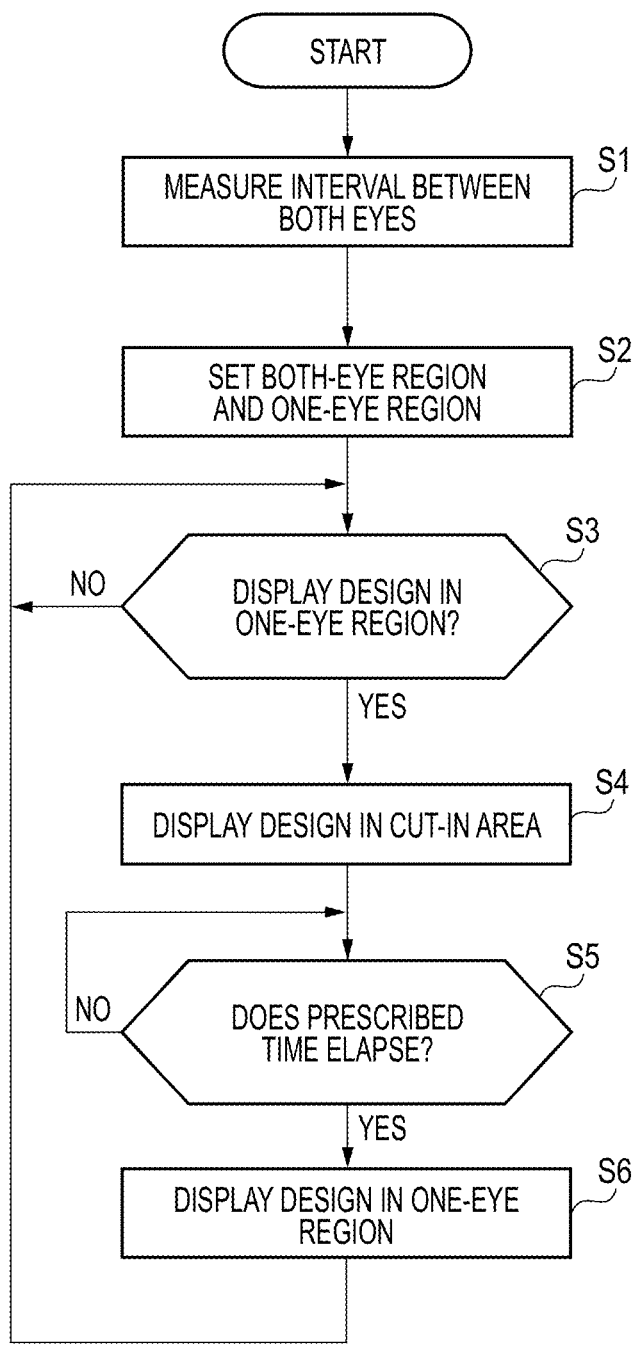
FIG. 4 is a flowchart showing operation of a control unit constituting the vehicle display device shown in FIG. 1 according to a first embodiment.

Thereafter, the operation of the control unit 23 described in the above outline will be described with reference to a flowchart in FIG. 4. The control unit 23 starts processing when an ignition switch is turned on. First, the control unit 23 measures an interval between both eyes of the driver 200 based on a driver image from the driver monitor 104 (S1).

Thereafter, the control unit 23 sets the both-eye region CB and the one-eye region CRL on the display screen of the image display unit 20 when the eyes 201 of the driver 200 are in the central positions of the eye box EB in the left-right direction based on the measured interval between both eyes and a known arrangement position of the optical system 25 (S2).

Thereafter, when determined necessary to display a design in the one-eye region CRL (Y in S3), the control unit 23 temporarily displays the design to be displayed in the cut-in display area A1 of the both-eye region CB (S4). Thereafter, after waiting for prescribed time to elapse (Y in S5), the control unit 23 moves and displays the design displayed in the cut-in area A1 to the one-eye region CRL (S6), and then returns to S3.

The cut-in display area A1 is an area for temporarily displaying a design of the one-eye region CRL, and the control unit 23 does not display a design to be displayed in the both-eye region CB in the cut-in display area A1.

According to the embodiment described above, when displaying a design in the one-eye region CRL, the control unit 23 temporarily displays the design in the cut-in display area A1 provided in the both-eye region CB that is easy to visually recognize, and then moves a display position of the design to the one-eye region CRL. Accordingly, the driver 200 is easy to notice the display of the design even when the design is displayed in the one-eye region CRL that is difficult to visually recognize.

Second Embodiment

Thereafter, a second embodiment will be described. The vehicle display device 1 of the second embodiment has the same configuration as that of the first embodiment, and thus detailed description thereof will be omitted herein.

Figure 5:
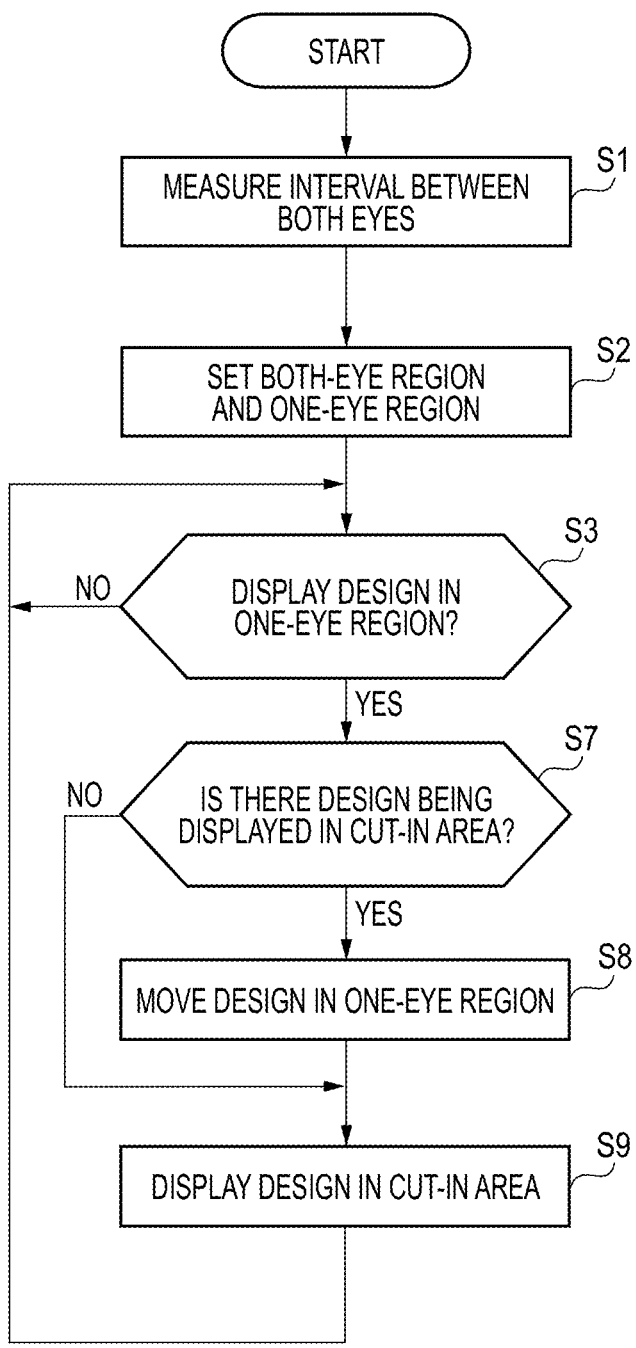
FIG. 5 is a flowchart showing operation of a control unit constituting the vehicle display device shown in FIG. 1 according to a second embodiment.

Operation of the control unit 23 is different in the first embodiment and the second embodiment. Thereafter, the operation of the control unit 23 in the second embodiment will be described with reference to a flowchart in FIG. 5. In FIG. 5, parts equivalent to those in the flowchart shown in FIG. 4 already described in the first embodiment are denoted by the same reference signs, and detailed description thereof is omitted.

First, as in the first embodiment, the control unit 23 measures an interval between both eyes (S1), and sets the both-eye region CB and the one-eye region CRL (S2).

Thereafter, when determined necessary to display a design in the one-eye region CRL (Y in S3), the control unit 23 determines whether there is a design being displayed in the cut-in display area A1 (S7). When there is a design being displayed in the cut-in display area A1 (Y in S7), the control unit 23 moves and displays the design to the one-eye region CRL (S8). Thereafter, the control unit 23 displays the design determined necessary to be displayed in S3 in the cut-in display area A1 (S9), and then returns to S3.

According to the above-described embodiment, after temporarily displaying the design in the cut-in display area A1, the control unit 23 continues displaying the design in the cut-in display area A1 until temporarily displaying, in the cut-in display area A1, another design necessary to be displayed in the one-eye region CRL thereafter. Accordingly, the driver 200 is easier to notice the display of the design even when the design is displayed in the one-eye region CRL that is difficult to visually recognize.

The present disclosure is not limited to the embodiments described above and can be appropriately modified, improved and the like. Materials, shapes, sizes, numbers, arrangement positions, and the like of components in the embodiments described above are freely selected and are not limited as long as the present disclosure can be implemented.

According to the above-described embodiments, the control unit 23 sets the both-eye region CB and the one-eye region CRL when the eyes are in a center of the eye box EB in the left-right direction. Alternatively, the present disclosure is not limited thereto. The both-eye region CB and the one-eye region CRL are on a left side when the eyes 201 are on a right side of the eye box EB, and are on the right side when the eyes 201 are on the left side of the eye box EB. The control unit 23 may periodically measure the positions of the eyes 201 (sightline position) and reset the both-eye region CB and the one-eye region CRL set according to the positions of the eyes 201.

According to the above-described embodiments, one cut-in display area A1 is provided in the both-eye region CB, and the present disclosure is not limited thereto. A plurality of cut-in display areas A1 may be provided in the both-eye region CB. Accordingly, it is possible to cope with a case in which it is necessary to display a plurality of designs at the same time in the one-eye region CRL.

The embodiments described above described a case in which the light reflected by the entire surface of the second mirror 22 is visually recognized by the driver 200. Alternatively, the present disclosure is not limited thereto. For example, an image may be cut off by the lid member 3. In this case, the both-eye region CB and the one-eye region CRL are determined by lines connecting the eyes 201 of the driver 200 and a right end position and a left end position of the opening 31 of the lid member 3.

In the above-described embodiments, the control unit 23 measures the interval between both eyes based on the driver image, and sets the both-eye region CB, the one-eye region CRL, and a non-display region CN based on the measured interval between both eyes. The control unit 23 may set the both-eye region CB, the one-eye region CRL, and the non-display region CN based on a predetermined average interval between both eyes without measuring the interval between both eyes.

Here, features of the embodiments of the vehicle display device according to the present disclosure described above are briefly summarized and listed in following [1] to [3].

[1] A vehicle display device (1) includes:
an image display unit (20) configured to emit display light (70) for an image;
an optical system configured to project the display light (70) emitted from the image display unit (20) toward a reflecting surface in front of a driver; and
a control unit configured to control the image display unit (20).

The image includes a both-eye region (CB) that is a region visually recognized by both eyes of the driver (200) and a one-eye region (CRL) that is a region visually recognized by only one eye of the driver (200), and
when displaying a design in the one-eye region (CRL), the control unit (23) temporarily displays the design in a cut-in display area (A1) provided in the both-eye region (CB) and then moves a display position of the design to the one-eye region (CRL).

According to the configuration of [1], when displaying the design in the one-eye region (CRL), the control unit (23) temporarily displays the design in the cut-in display area (A1) provided in the both-eye region (CB) that is easy to visually recognize, and then moves a display position of the design to the one-eye region (CRL). Accordingly, the driver (200) is easy to notice the display of the design even when the design is displayed in the one-eye region (CRL) that is difficult to visually recognize.

[2] In the vehicle display device (1) according to [1], a plurality of the cut-in display areas (A1) are provided in the both-eye region (CB).

According to the configuration of [2], the plurality of cut-in display areas (A1) are provided in the both-eye region (CB). Accordingly, it is possible to cope with a case in which it is necessary to display a plurality of designs at the same time in the one-eye region (CRL).

[3] In the vehicle display device according to claim 1,
after temporarily displaying the design in the cut-in display area (A1), the control unit (23) continues displaying the design in the cut-in display area (A1) until temporarily displaying, in the cut-in display area (A1), another design to be displayed in the one-eye region (CRL) thereafter.

According to the configuration of [3], the driver (200) is easier to notice the display of the design even when the design is displayed in the one-eye region (CRL) that is difficult to visually recognize.

What is claimed is:

1. A vehicle display device comprising:
an image display device that includes a display screen and emits display light for an image;
an optical system that projects the display light emitted from the image display unit toward a reflecting surface in front of a driver; and
a controller that controls the image display unit, wherein
the image includes a both-eye region that is a region visually recognized by both eyes of the driver and a one-eye region that is a region visually recognized by only one eye of the driver,
the both-eye region has a bottom edge, and
when displaying a design in the one-eye region, the controller temporarily displays the design in a cut-in display area provided in the both-eye region and then moves a display position of the design from the cut-in display area to the one-eye region in a direction that is parallel to the bottom edge of the both-eye region, and a size of the design in the one-eye region is equal to a size of the design in the cut-in display area.

2. The vehicle display device according to claim 1, wherein a plurality of the cut-in display areas are provided in the both-eye region.

3. The vehicle display device according to claim 1, wherein after temporarily displaying the design in the cut-in display area, the controller continues displaying the design in the cut-in display area until temporarily displaying, in the cut-in display area, another design to be displayed in the one-eye region thereafter.

* * * * *